United States Patent
Kim et al.

(10) Patent No.: US 8,633,762 B2
(45) Date of Patent: Jan. 21, 2014

(54) INTEGRATED CIRCUIT CHIP AND TRANSMITTING /RECEIVING SYSTEM INCLUDING THE SAME

(75) Inventors: Yong-Ju Kim, Gyeonggi-do (KR);
Dae-Han Kwon, Gyeonggi-do (KR);
Hae-Rang Choi, Gyeonggi-do (KR);
Jae-Min Jang, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 106 days.

(21) Appl. No.: 13/333,692

(22) Filed: Dec. 21, 2011

(65) Prior Publication Data
US 2013/0051491 A1    Feb. 28, 2013

(30) Foreign Application Priority Data
Aug. 22, 2011  (KR) .......................... 10-2011-0083696

(51) Int. Cl.
*H01L 25/00*  (2006.01)
(52) U.S. Cl.
USPC .......................................... 327/565; 327/379

(58) Field of Classification Search
USPC .................................. 327/379, 384, 564, 565
See application file for complete search history.

(56) References Cited

U.S. PATENT DOCUMENTS

| | | | |
|---|---|---|---|
| 7,382,151 B1 * | 6/2008 | Truong et al. .................... | 326/27 |
| 7,471,670 B1 | 12/2008 | Chen et al. | |
| 7,521,968 B2 | 4/2009 | Dreps et al. | |
| 7,694,202 B2 * | 4/2010 | Swanson et al. ............... | 714/738 |
| 7,899,653 B2 * | 3/2011 | Hollis ................................ | 703/2 |
| 8,078,926 B2 * | 12/2011 | Block et al. .................... | 714/727 |

FOREIGN PATENT DOCUMENTS

KR    1020110031169    3/2011

* cited by examiner

*Primary Examiner* — Jeffrey Zweizig
(74) *Attorney, Agent, or Firm* — IP & T Group LLP (57) ABSTRACT

A system for transmitting data includes a plurality of data lines configured to transmit the data and a transmitting chip configured to output the data to the data lines and perform a crosstalk prevention operation in response to a data pattern of the data to be transmitted through the data lines and array information of the data lines to prevent crosstalk from occurring in the data lines.

21 Claims, 8 Drawing Sheets

INTEGRATED CIRCUIT CHIP AND TRANSMITTING /RECEIVING SYSTEM INCLUDING THE SAME

CROSS-REFERENCE TO RELATED APPLICATIONS

The present application claims priority of Korean Patent Application No. 10-2011-0083696, filed on Aug. 22, 2011, which is incorporated herein by reference in its entirety.

BACKGROUND

1. Field

Exemplary embodiments of the present invention relate to data transmission technology, and more particularly, to a technology for preventing crosstalk occurring during the data transmission.

2. Description of the Related Art

Generally, in a high-speed data transmission, jitter may be caused in the transmission data/signal by Inter-Symbol Interference (ISI), random noises, etc. Specially, crosstalk may cause the jitter of the transmission signal to affect the data transmission.

Figure 1:
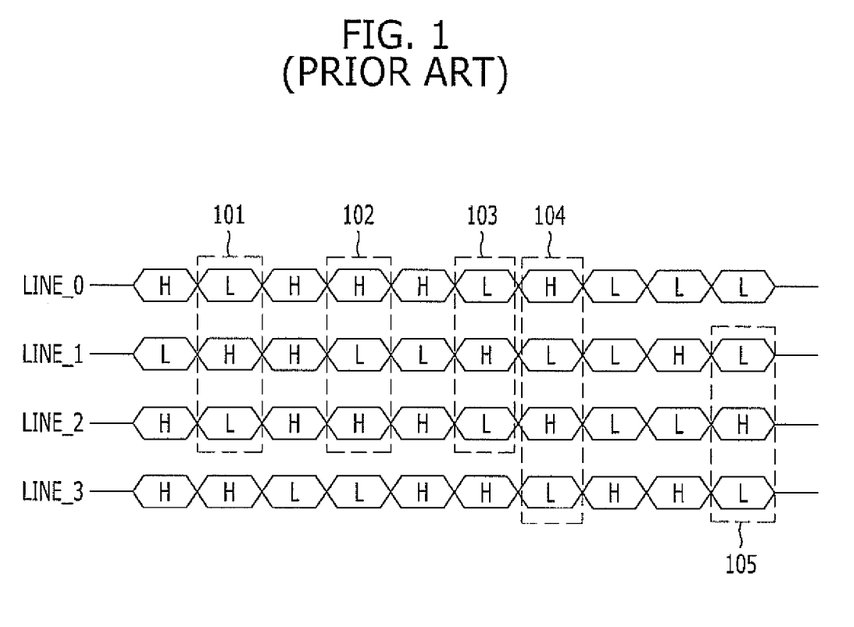
FIG. 1 is an exemplary diagram showing crosstalk occurring in a plurality of lines LINE_0 to LINE_3 through which data are transmitted.

FIG. 1 illustrates a diagram for showing crosstalk occurring in a plurality of lines LINE_0 to LINE_3 through which data are transmitted.

The data may be loaded on the respective lines LINE_0 to LINE_3 in order from the leftmost data of the drawing to the rightmost data thereof.

Crosstalk may occur due to capacitance appearing between adjacent two data lines. The crosstalk feature may become more serious when, among adjacent three lines, two lines respectively adjacent to a central line are loaded with data which have a level transition opposite to that of data loaded on the central line. In this case, the data pattern is referred to as a 2-aggressor-1-victim pattern.

Numeral references '101', '102', '103', '104', and '105' of FIG. 1 illustrate the pattern. Referring to the pattern '101', the data of a second line LINE_1 transitions from a logic low level 'L' to a logic high level 'H', but the data of a first line LINE_0 and a third line LINE_2 all transition from a logic high level 'H' to a logic low level 'L'. Therefore, it may be difficult to make the data transition of the second line LINE_1 due to crosstalk. Likewise, since the data transition of the central line is opposite to the data transition of the lines LINE_0 and LINE_2 or LINE_1 and LINE_3 respectively adjacent to the central line LINE_1 or LINE_2 as shown in the patterns '102', '103', and '105', it may be difficult to make the data transition of the central line LINE_1 or LINE_2.

In case of the pattern '104', the data of the second line 1 LINE_1 and the data of the third data line LINE_2 may have difficulty in transitioning, because the data transition of data lines LINE_0 and LINE_2 adjacent to the second line LINE_1 and the data transition of data lines LINE_1 and LINE_3 adjacent to the third line LINE_2 are made in opposite directions to the data transitions of the second and third data lines LINE_1 and LINE_2, respectively.

Figure 2:
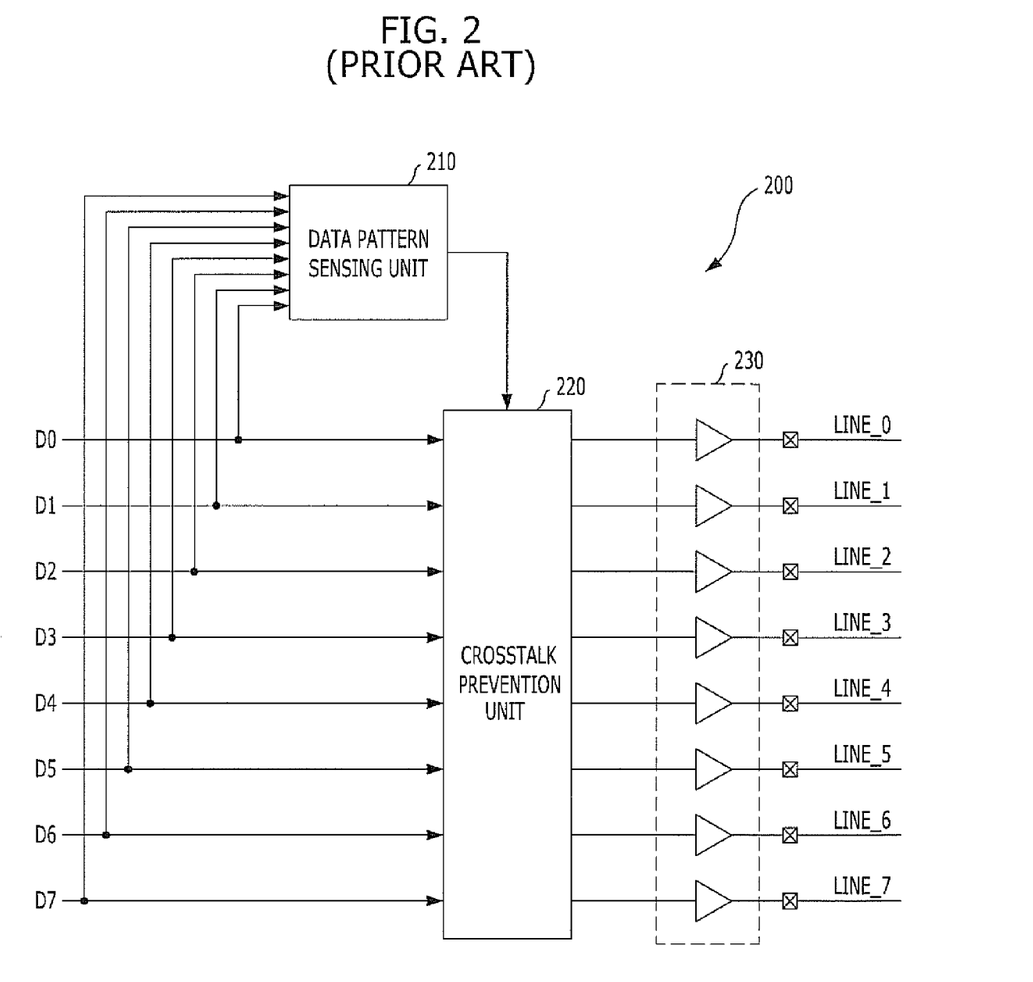
FIG. 2 is a block diagram illustrating a conventional scheme for preventing a crosstalk in a transmitting chip that transmits data.

FIG. 2 illustrates a conventional scheme for preventing a crosstalk in a transmitting chip that transmits data.

Referring to FIG. 2, a transmitting chip 200 includes a data pattern sensing unit 210, a crosstalk prevention unit 220, and a data output circuit 230.

The data pattern sensing unit 210 senses the pattern of the data D0 to D7 to be transmitted by the transmitting chip 200 and decide whether a crosstalk may occur in any data line of first to eighth data lines LINE_0 to LINE_7. For example, the data pattern sensing unit 210 senses if the data of adjacent data lines have the same transition as the patterns '101' and '105' shown in FIG. 1.

The crosstalk prevention unit 220 performs an operation for preventing crosstalk from occurring in the data to be transmitted based on the sensing result of the data pattern sensing unit 210. The occurrence of the crosstalk may be prevented by (1) changing a delay value of a data, (2) changing a driving force of a data, or (3) changing a logic value of a data. In case that (1) the delay value of a data is changed, the influence of crosstalk may be reduced by increasing the delay value of an aggressor data or by decreasing the delay value of a victim data. The influence of crosstalk may be decreased (2) by controlling a victim data with a strong driving force or by controlling an aggressor data with a slightly week driving force. The data pattern, which may cause a crosstalk, may be removed (3) by inverting data contained therein.

The data output circuit 230 outputs data obtained from a crosstalk prevention operation performed by the crosstalk prevention unit 220 to the outside of the transmitting chip 200.

In short, according to the conventional crosstalk prevention scheme, the pattern of transferred data is sensed and a crosstalk prevention operation is performed based on the sensed result.

Figure 3A:
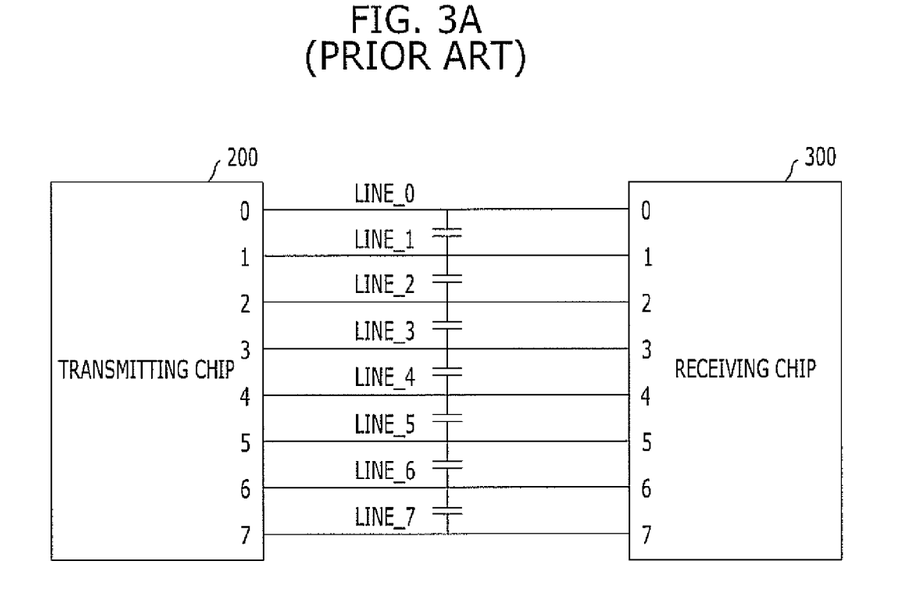
FIGS. 3A and 3B are block diagrams illustrating first to eighth data lines LINE_0 to LINE_7 arrayed between a transmitting chip 200 and a receiving chip 300.
Figure 3B:
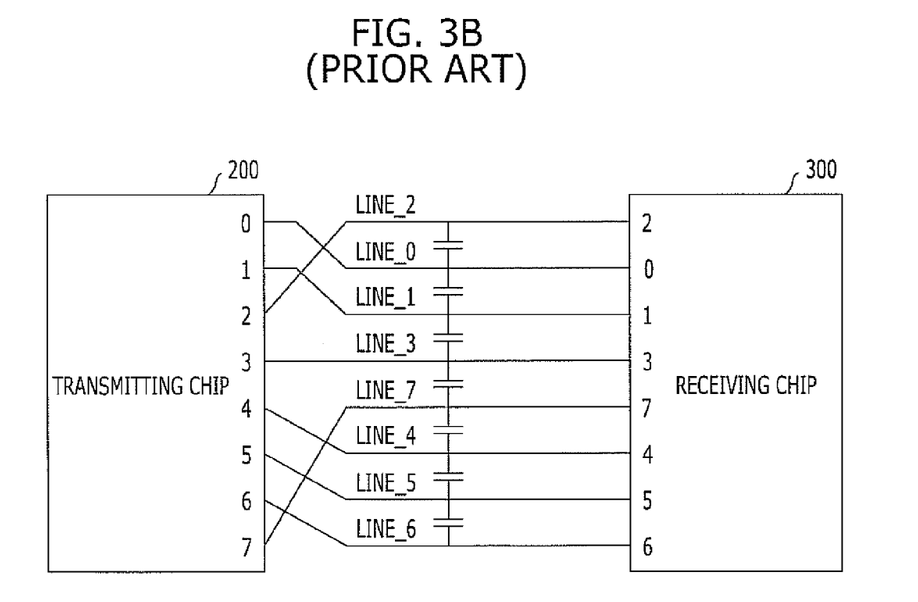

FIGS. 3A and 3B illustrate the first to eighth data lines LINE_0 to LINE_7 arrayed between the transmitting chip 200 and a receiving chip 300. The capacitors illustrated in FIGS. 3A and 3B indicate parasitic capacitor components existing between the first to eighth data lines LINE_0 to LINE_7.

Referring to FIG. 3A, the array of first to eighth data pins 0 to 7 of the transmitting chip 200 matches the array of the first to eighth data lines LINE_0 to LINE_7 coupled to the respective data pins. That is, the data pin number, for example, '0', is identical to the position order '0' of corresponding data line LINE_0. Therefore, sensing the data pattern shown in FIG. 2 and performing a crosstalk prevention operation based on the sensed result may decrease the influence of crosstalk.

Referring to FIG. 3B, the array of first to eighth data pins 0 to 7 is different from the array of the first to eighth data lines LINE_0 to LINE_7. That is, the data pin number of the transmitting chip 200, for example, '0', is not identical to the position order '1' of corresponding data line LINE_1. The transmitting chip 200 performs a crosstalk prevention operation based on adjacent data pins of the transmitting chip 200. Since the first to eighth data lines LINE_0 to LINE_7 have position orders different from respective data pin numbers of the transmitting chip 200, the crosstalk prevention operation shown of the scheme in FIG. 2 may not performed on the array of data lines shown in FIG. 3B. For example, the transmitting chip 200 senses the data pattern of the third data pin 2 and the fifth data pin 4, which are adjacent data pins of the fourth data pin 3 coupled to the fourth data line LINE_3, and performs the crosstalk prevention operation for the data of the fourth data line LINE_3. However, the fourth data line LINE_3 is actually adjacent to the second data line LINE_1 and the eighth data line LINE_7 and the above crosstalk prevention operation based on the pin array may not work on the line array. That is, since the array of the first to eighth data pins 0 to 7 of the transmitting chip 200 are different from the array of the first to eighth data lines LINE_0 to LINE_7, the crosstalk prevention scheme based on the data pattern of the first to eighth data pins 0 to 7 may not appropriately performed on the array of the first and eighth data lines LINE_0 to LINE_7 shown in FIG. 3B.

As the data transmission rate becomes higher, the bandwidth of data, which is the number of data lines, is increased as well. Accordingly, a semiconductor device fabrication process is being complicated, such as fabrication of a multi-layered circuit board. As a result, as shown in FIG. 3B, the array of the first to eighth data pins 0 to 7 over the transmitting chip 200 may be desirable to be different from the array of the first to eighth data lines LINE_0 to LINE_7 in a position order over a circuit board.

Therefore, it is desired to properly perform a crosstalk prevention operation even though the array of the first to eighth data pins 0 to 7 of the transmitting chip 200 is different from the array of the first to eighth data lines LINE_0 to LINE_7, each coupled to a corresponding data pin.

SUMMARY

Exemplary embodiments of the present invention are directed to technology that may prevent crosstalk from occurring even though the array of data pins of a transmitting chip is different from the array of data lines coupling the respective data pins to a receiving chip.

In accordance with an exemplary embodiment of the present invention, a system for transmitting data includes: a plurality of data lines configured to transmit the data; and a transmitting chip configured to output the data to the data lines and perform a crosstalk prevention operation in response to a data pattern of the data to be transmitted through the data lines and array information of the data lines to prevent crosstalk from occurring in the data lines.

In accordance with another embodiment of the present invention, an integrated circuit chip for transmitting data through a plurality of data lines includes: a plurality of drivers configured to output the data to the data lines; a storage circuit configured to store array information of the data lines; a pattern sensing circuit configured to sense a data pattern of the data to be transmitted through the data lines based on the array information; and a crosstalk prevention unit configured to control the data outputted by the drivers in response to the sensed data pattern of the pattern sensing circuit.

In accordance with yet another embodiment of the present invention, a circuit board includes a substrate, a transmitting chip disposed over the substrate, a receiving chip disposed over the substrate; and a plurality of data lines disposed between the transmitting chip to the receiving chip over the substrate, wherein the transmitting chip is configured to perform a crosstalk prevention operation for preventing crosstalk from occurring in the data lines in response to a data pattern of data to be transmitted through the data lines and array information of the data lines.

In accordance with still another embodiment of the present invention, a method for transmitting data through a plurality of data lines includes sensing a data pattern of the data depending on an array of the data lines in response to array information on the array of the data lines, and performing a crosstalk prevention operation on the data by loading the data on the data lines based on the sensed data pattern.

DETAILED DESCRIPTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 4:
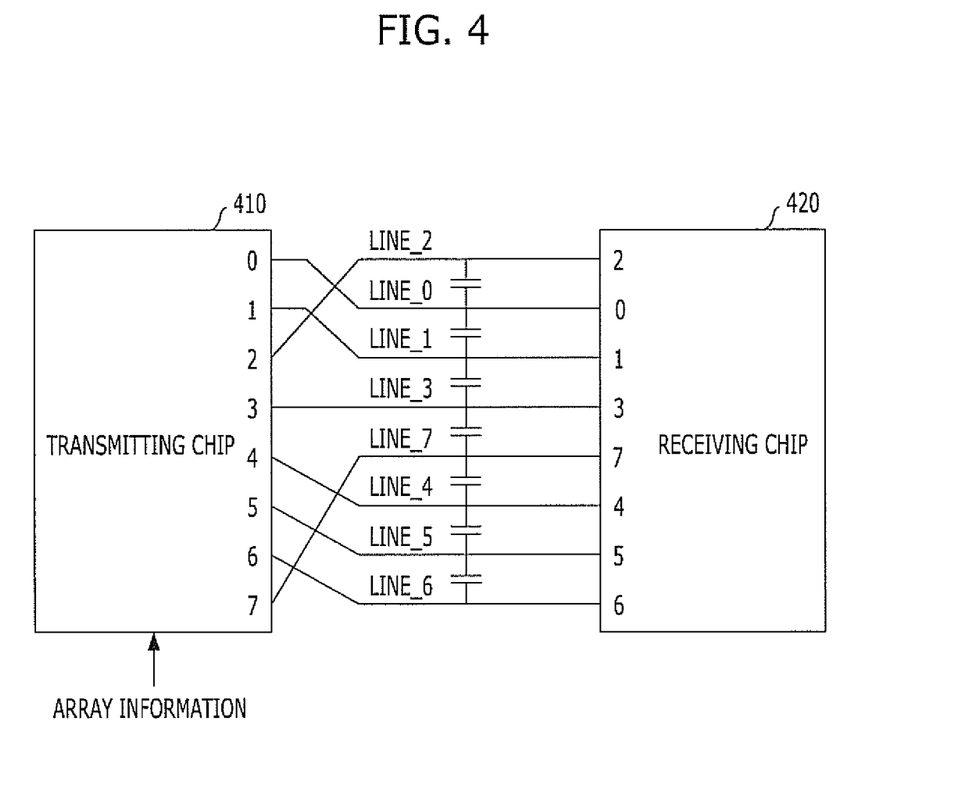
FIG. 4 is a block diagram illustrating a transmitting/receiving system in accordance with an exemplary embodiment of the present invention.

FIG. 4 is a block diagram illustrating a transmitting/receiving system in accordance with an exemplary embodiment of the present invention.

Referring to FIG. 4, the transmitting/receiving system includes a transmitting chip 410, a receiving chip 420, and a plurality of data lines LINE_0 to LINE_7.

The transmitting chip 410 transmits its output data to the receiving chip 420 through the first to eighth data lines LINE_0 to LINE_7. The transmitting chip 410 receives 'array information'. The array information is information which represents how the first to eighth data lines LINE_0 to LINE_7 are arranged between the transmitting chip 410 and the receiving chip 420. That is, the array information includes, for example, a position order for each data line of the first to eighth data lines LINE_0 to LINE_7. The transmitting chip 410 may decide which data lines are arrayed adjacent to a target data line based on the array information, and as a result, the transmitting chip 410 may perform a crosstalk prevention operation in consideration of the data pattern loaded onto the target data line and the data lines adjacent to the target data line. For example, in order to protect the data outputted through the fourth data pin 3 from crosstalk, the transmitting chip 410 may perform a crosstalk prevention operation by sensing the data pattern of the second, fourth, and eighth data pins 1, 3, and 7 based on the array information, instead of sensing the data pattern of third, fourth, and fifth data pins 2, 3, and 4.

In other words, the transmitting chip 410 may accurately sense the data pattern causing crosstalk over the external first to eighth data transmission lines LINE_0 to LINE_7 by using the array information. According to conventional technology, the crosstalk prevention operation of a transmitting chip may not appropriately performed if the array of data pins over the transmitting chip 410 and the array of data lines coupling the respective data pins are different in a position order. However, according to the exemplary embodiment of the present invention that uses the array information, if the array of the data pins over the transmitting chip 410 and the array of the data lines are different in a position order, the transmitting chip 410 may correctly sense the array difference based on the array information and perform an accurate crosstalk prevention operation.

Table 1 shows an example of the array information when the first to eighth data pins 0 to 7 and the first to eighth data lines LINE_0 to LINE_7 are arrayed as shown in FIG. 4.

TABLE 1

| Data pin number | Position order of corresponding data line among data lines |
|---|---|
| 0 | 1 |
| 1 | 2 |
| 2 | 0 |
| 3 | 3 |
| 4 | 5 |
| 5 | 6 |
| 6 | 7 |
| 7 | 4 |

Referring to Table 1, it may be detected that the data outputted from a data pin having a data pin number, for example, '1', of the first to eighth data pins 0 to 7 is transmitted through the second data line LINE_1 having a position order '2', among the first to eighth data lines LINE_0 to LINE_7. That is, based on the array information shown in Table 1, it may be determined that the data of the fourth data pin 3 is transferred through the fourth data line LINE_3 having a position order '3' adjacent to the second and eighth data lines LINE_1 and LINE 7 having position orders '2' and '4'. The second and eighth data lines LINE_1 and LINE 7 serves to transmit the data of the second and eighth data pins 1 and 7.

As shown, the array information is inputted from the outside of the transmitting chip 410. The array information may be inputted from another chip, e.g., the receiving chip 420, coupled to the system or board containing the transmitting chip 410, or it may be inputted into the transmitting chip 410 by the system manufacturer. Also, the array information may be stored in transmitting chip 410 by a system assembler who may obtain the array information of the data lines deposited over a circuit board or substrate. Whatever the method is, the array information of the data lines coupled to the transmitting chip 410 can be inputted into the transmitting chip 410.

Figure 5:
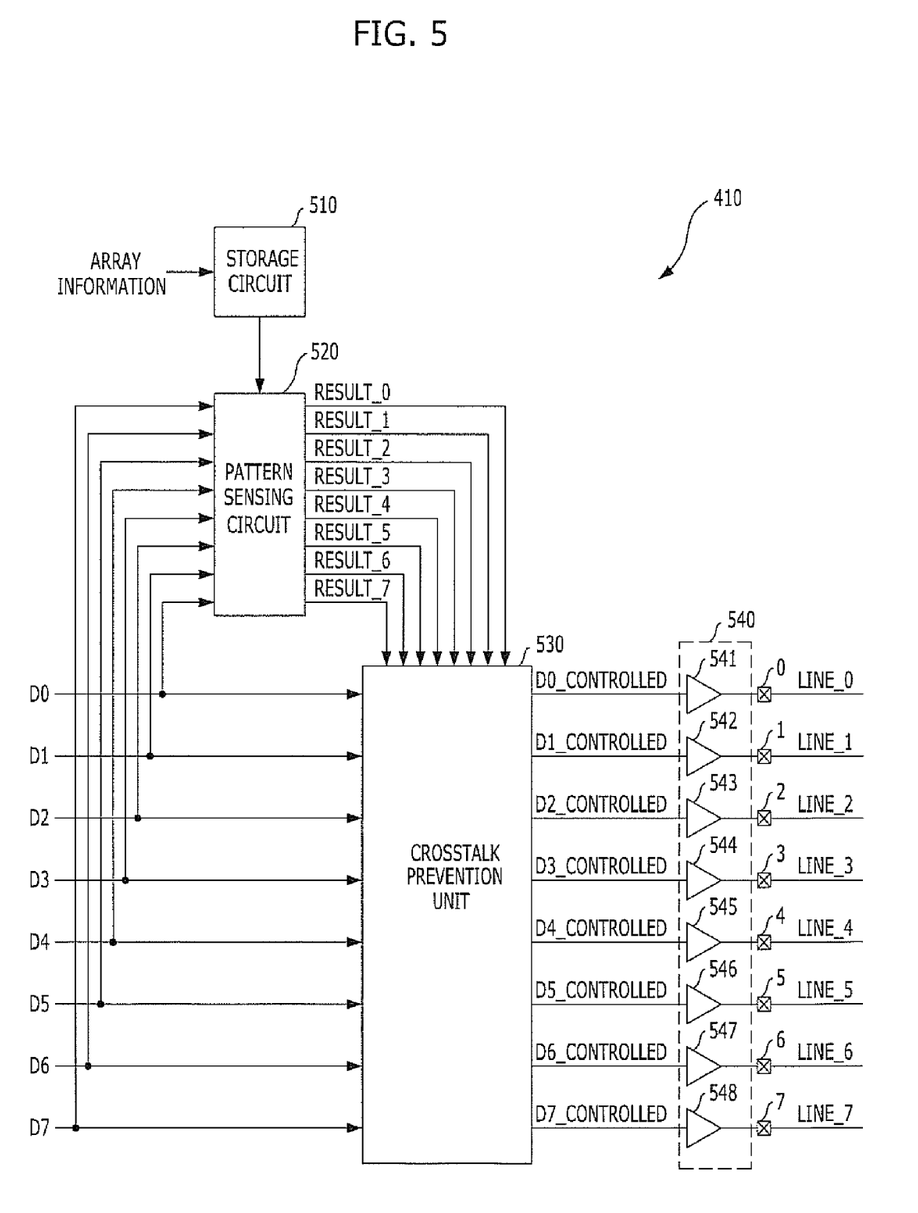
FIG. 5 is a block diagram illustrating a transmitting chip 410 shown in FIG. 4.

FIG. 5 is a block diagram illustrating the transmitting chip 410 shown in FIG. 4.

Referring to FIG. 5, the transmitting chip 410 includes a storage circuit 510, a pattern sensing circuit 520, a crosstalk prevention unit 530, and a data output unit 540.

The storage circuit 510 is a circuit for storing array information. The storage circuit 510 may include any kind of circuit that may store data, such as a latch circuit, a fuse circuit, and a non-volatile memory device.

The pattern sensing circuit 520 senses the data pattern of first to eighth data D0 to D7 to be loaded onto the first to eighth data lines LINE_0 to LINE_7 based on the array information stored in the storage circuit 510. Since the array information includes information which represents a position order for a corresponding data line among the first to eighth data lines LINE_0 to LINE_7 arrayed outside the transmitting chip 410, the pattern sensing circuit 520 may sense the actual data pattern of the first to eighth data lines LINE_0 to LINE_7 based on the array information. First to eighth pattern sensing results RESULT_0 to RESULT_7 of the pattern sensing circuit 520 show whether the corresponding data among the first to eighth data D0 to D7 is a victim or not. This only illustrates the concept of the present invention and therefore, it is not limited thereto, and each of the first to eighth pattern sensing results RESULT_0 to RESULT_7 may be formed of multiple bits and may include information denoting whether the corresponding data among the first to eighth data D0 to D7 is an aggressor or a victim or whether it is neither aggressor nor victim.

The crosstalk prevention unit 530 performs a crosstalk prevention operation for the first to eighth data D0 to D7 to be outputted from the transmitting chip 410 in response to the pattern sensing result of the pattern sensing circuit 520. As described above, the crosstalk prevention operation includes (1) a method of changing the delay value of the first to eighth data D0 to D7, (2) a method of changing a driving force of the data output unit 540, and (3) a method of changing the logic value of the first to eighth data D0 to D7. Hereinafter, it is described as an example that the crosstalk prevention unit 530 performs a crosstalk prevention operation by decreasing the delay value of a victim data when the first to eighth pattern sensing results RESULT_0 to RESULT_7 are enabled.

The data output unit 540 outputs data D0_CONTROLLED to D7_CONTROLLED obtained from the crosstalk prevention operation performed in the crosstalk prevention unit 530 to a plurality of data lines arrayed outside of the transmitting chip 410. The data output unit 540 may include first to eighth drivers 541 to 548 that correspond to the first to eighth data pins 0 to 7, respectively.

Figure 6:
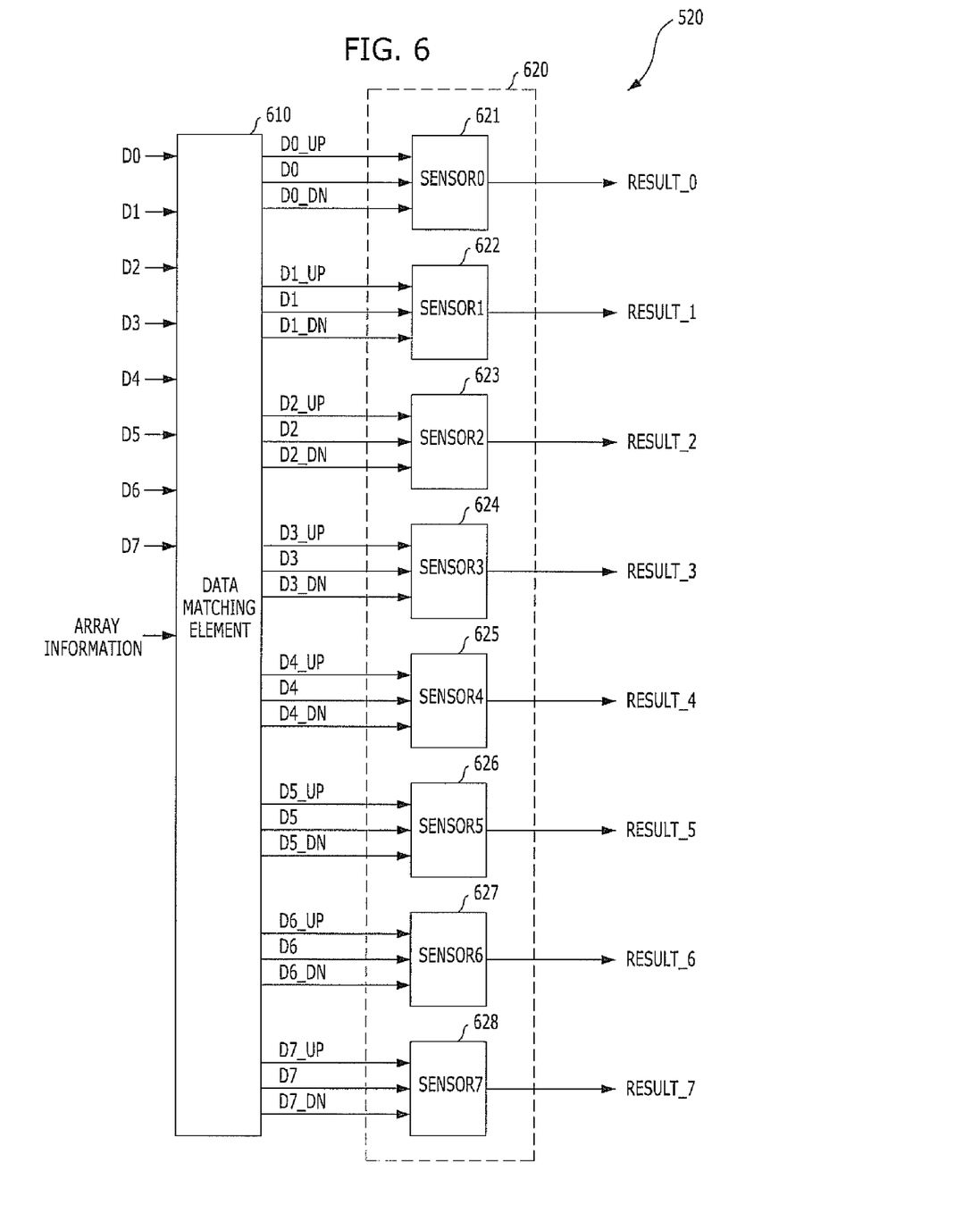
FIG. 6 is a block diagram illustrating a pattern sensing circuit 520 shown in FIG. 5.

FIG. 6 is a block diagram illustrating the pattern sensing circuit 520 shown in FIG. 5.

Referring to FIG. 6, the pattern sensing circuit 520 includes a data matching element 610 and a pattern sensing element 620. The data matching element 610 matches data of adjacent data lines among the first to eighth data lines LINE_0 to LINE_7 based on the array information. The pattern sensing element 620 senses the data pattern of the data that are matched by the data matching element 610.

The data matching element 610 receives the array information and the output data D0 to D7 and matches the data to be outputted to a target data line and two adjacent data lines adjacent to the target data line among the first to eighth data lines LINE_0 to LINE_7. Among the matched data DX_UP, DX, and DX_DN, X being an integer number between 0 and 7, a data DX_UP denotes the data to be outputted through the data line disposed right over a target data line for a data DX and a data DX_DN denotes the data to be outputted through the data line disposed right under the target data line for the data DX. The target data line may indicate one of the first to eighth data lines LINE_0 to LINE_7

The following Table 2 shows the matched data of the data matching element 610 when the first to eighth data lines LINE_0 to LINE_7 are arrayed as shown in Table 1.

TABLE 2

| Symbol | Data | Symbol | Data | Symbol | Data | Symbol | Data |
|---|---|---|---|---|---|---|---|
| D0_UP | D2 | D2_UP | Fixed to H | D4_UP | D7 | D6_UP | D5 |
| D0 | D0 | D2 | D2 | D4 | D4 | D6 | D6 |
| D1_DN | D1 | D2_DN | D0 | D4_DN | D5 | D6_DN | Fixed to H |
| D1_UP | D0 | D3_UP | D1 | D5_UP | D4 | D7_UP | D3 |
| D1 | D1 | D3 | D3 | D5 | D5 | D7 | D7 |
| D1_DN | D3 | D3_DN | D7 | D5_DN | D6 | D7_DN | D4 |

Referring to Table 2, since the sixth data D5 is transmitted to a target data line LINE_5, the data D5_UP and D5_DN are transmitted to adjacent data lines LINE_4 and LINE_6 adjacent to the target data line LINE_5 and are matched as data D4 and D6. Also, since the fourth data D3 is transferred to a target data line LINE_3, the data DX_UP and D3_DN are transmitted to adjacent data lines LINE_1 and LINE_7 adjacent to the target data line LINE_3 and are matched as D1 and D.

Meanwhile, data D2_UP is fixed to have a logic high 'H' level. This is because, as shown in FIG. 4, the third data D2 is transferred through the uppermost data line LINE_2 and thus there is no adjacent data line over the third data line LINE_2 through which the third data D2 is transferred. Likewise, data D5_DN is fixed to have a logic high 'H' level, because the seventh data D6 is transferred through the lowermost data line LINE_6 and thus there is no adjacent data line under the seventh data line LINE_6 through which the seventh data D6 is transferred. Although "uppermost," "lowermost," and the like are described with reference to the figures for illustrative purpose, the spatial array for data lines is not limited thereto.

The pattern sensing element 620 senses the data pattern of the data that are matched by the data matching element 610. The pattern sensing element 620 includes as many sensors 621 to 628 as the number of the data. The first sensor 621 receives the data D0_UP, D0, and D0_DN that are matched for the first data D0 and senses the data pattern. The second sensor 622 receives the data D1_UP, D1, and D1_DN that are matched for the second data D1 and senses the data pattern. Likewise, the third to eighth sensors 623 to 628 receive the data that are matched for the corresponding data and senses the data pattern. The first to eighth sensors 621 to 628 enable the output signals RESULT_0 to RESULT_7 and output the enabled output signals RESULT_0 to RESULT_7, when the first to eighth data D0 to D7 corresponding thereto are victims.

The following Table 3 shows conditions for the first to eighth sensors 621 to 628 to enable the output signals RESULT_0 to RESULT_7. Here, X denotes an integer number between 0 and 7.

TABLE 3

| Enabling condition 1 of RESULT_X | | | Enabling condition 2 of RESULT_X | | |
|---|---|---|---|---|---|
| DX_UP | H → L | DX is victim because DX alone transitions from L to H. | DX_UP | L → H | DX is victim because DX alone transitions from H to L. |
| DX | L → H | | DX | H → L | |
| DX_DN | H → L | | DX_DN | L → H | |

Referring to table 3, when the data DX transitions to have an opposite level to those of adjacent data DX_UP and DX_DN, the output result RESULT_X is enabled.

Figure 7:
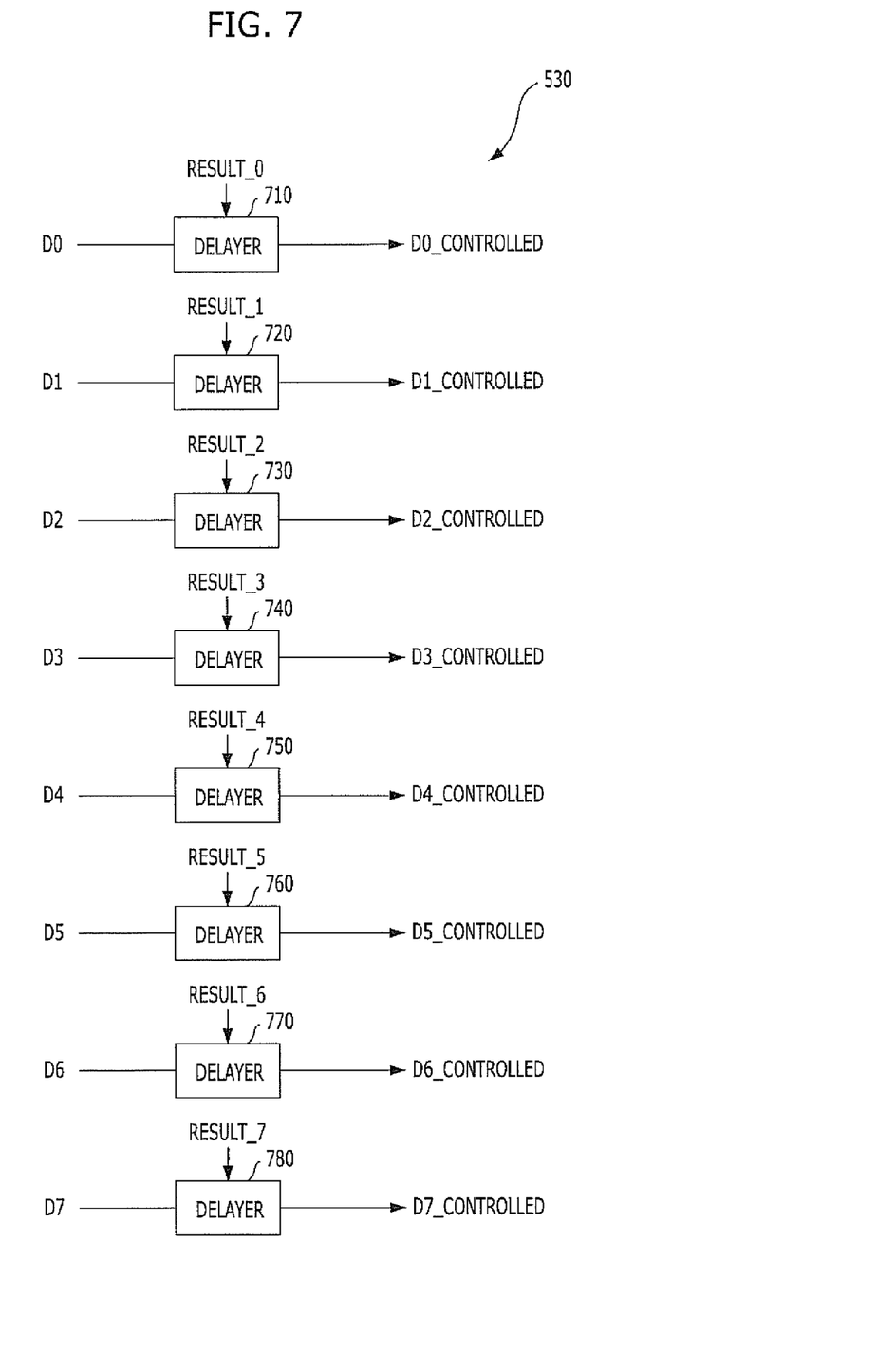
FIG. 7 is a block diagram illustrating a crosstalk prevention unit 530 shown in FIG. 5.

FIG. 7 is a block diagram illustrating the crosstalk prevention unit 530 shown in FIG. 5.

Referring to FIG. 7, the crosstalk prevention unit 530 includes a plurality of delayers 710 to 780 which correspond to the first to eighth data D0 to D7, respectively.

The first to eighth delayers 710 to 780 delay the first to eighth data D0 to D7 in response to the pattern sensing results RESULT_0 to RESULT_7 of the pattern sensing circuit 520, respectively. When the pattern sensing results RESULT_0 to RESULT_7 are disabled, the first to eighth delayers 710 to 780 delay the first to eighth data D0 to D7 as much as an initial delay value. When the pattern sensing results RESULT_0 to RESULT_7 are enabled, the first to eighth delayers 710 to 780 delay the first to eighth data D0 to D7 by a value smaller than the initial delay value. In short, when the pattern sensing results RESULT_0 to RESULT_7 are enabled, the delay value of the corresponding first to eighth delayers 710 to 780 is decreased.

As described above, since the pattern sensing results RESULT_0 to RESULT_7 is enabled when the corresponding first to eighth data D0 to D7 are victim data, the first to eighth delayers 710 to 780 less delays victim data and more delays the other data that are not the victim data. After all, the victim data having difficulty in transitioning due to crosstalk may transition prior to the other data, such as aggressor data, and be transferred through the first to eighth data lines LINE_0 to LINE_7.

Figure 8:
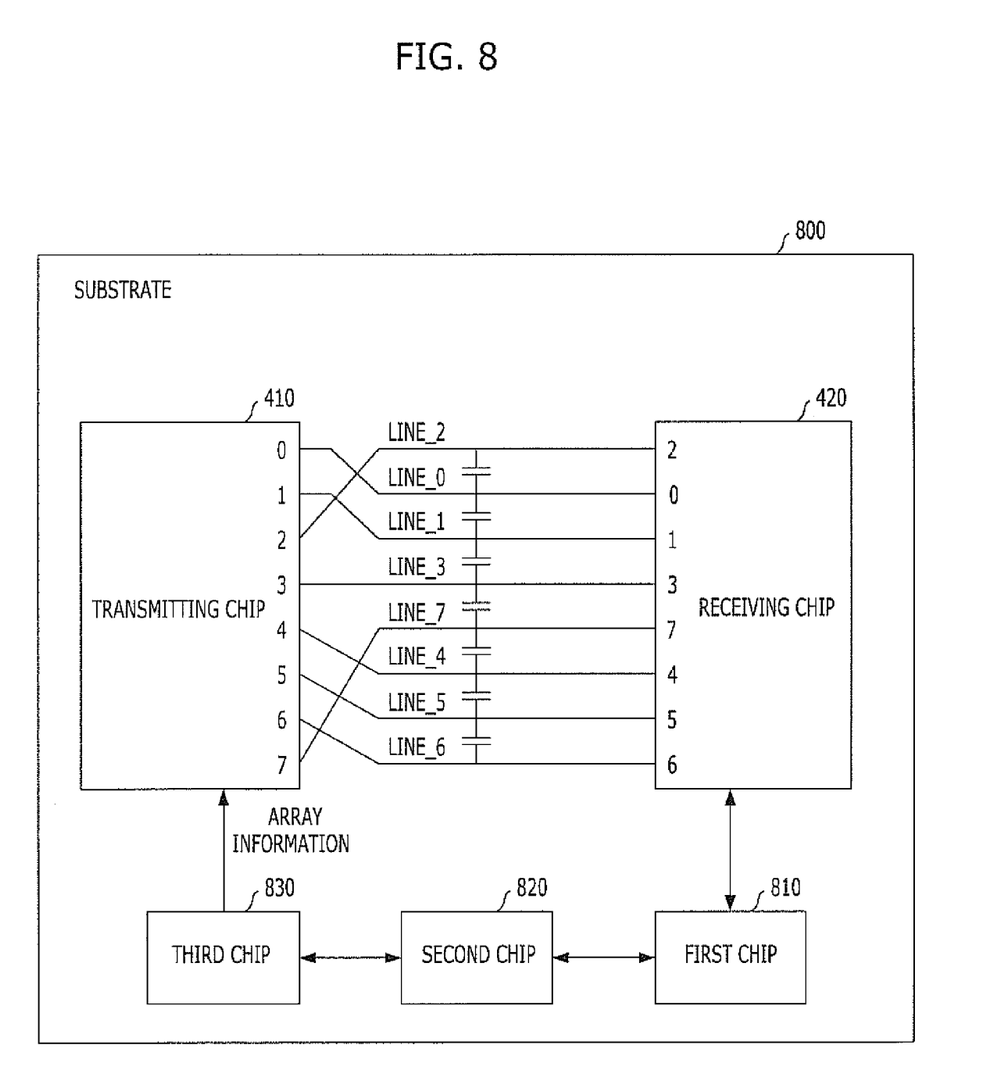
FIG. 8 is a block diagram illustrating a circuit board in accordance with an exemplary embodiment of the present invention.

FIG. 8 is a block diagram illustrating a circuit board in accordance with an exemplary embodiment of the present invention.

Referring to FIG. 8, the circuit board includes a substrate 800, a transmitting chip 410, a receiving chip 420, and a plurality of data lines LINE_0 to LINE_7. The circuit board may also include first to third chips 810, 820, and 830 disposed over the substrate 800.

The transmitting chip 410, as described above, decides how the first to eighth data lines LINE_0 to LINE_7 are actually arrayed over the substrate 800 and performs a crosstalk prevention operation based on the array information. FIG. 8 illustrates a case that the array information, which indicates the position order of each of the first to eighth data lines LINE_0 to LINE_7 over the substrate 800, is transferred from one chip 830 to the transmitting chip 410 over the substrate 800.

The circuit board illustrated in FIG. 8 may be one of such applications as a main board of a personal computer (PC), a graphic card, a circuit board of a mobile phone, and the like. Also, the transmitting chip 410 may includes a memory and the receiving chip 420 may includes a memory controller.

Referring back to FIGS. 4 to 7, a method for transmitting data in an integrated circuit chip in accordance with an exemplary embodiment of the present invention is described.

The method for transmitting data in an integrated circuit chip in accordance with an exemplary embodiment of the present invention includes sensing a data pattern of first to eighth data D0 to D7 to be formed over a plurality of data lines LINE_0 to LINE_7 based on array information, which is information indicating the position order of each of the data lines LINE_0 to LINE_7 disposed outside a transmitting chip 410; performing a crosstalk prevention operation for the first to eighth data D0 to D7 based on the sensed data pattern; and outputting output data D0_CONTROLLED to D7_CONTROLLED obtained from the crosstalk prevention operation to the outside of the transmitting chip 410.

As described above, the crosstalk prevention operation may be performed through a method of adjusting the delay value of the first to eighth data D0 to D7 or a method of controlling the driving force of the data output unit 540.

The process of sensing the data pattern may include: matching data to be outputted to adjacent data lines among the first to eighth data lines LINE_0 to LINE_7 based on the array information; and sensing the data pattern of the matched data.

According to an embodiment of the present invention, a data pattern is sensed not based on the array of data pins over a transmitting chip but based on the array of data lines between the transmitting chip and a receiving chip, and a crosstalk prevention operation is performed based on the sensed data pattern. Therefore, a crosstalk may be properly performed although the array of data pins over a transmitting chip and the array of data transmission lines are different from each other.

While the present invention has been described with respect to the specific embodiments, it will be apparent to those skilled in the art that various changes and modifications may be made without departing from the spirit and scope of the invention as defined in the following claims.

In particular, in accordance with the present invention is that the difference between the array of data pins over a transmitting chip and the array of the data lines disposed out of the transmitting chip may be addressed by accurately sensing the data pattern, that is formed in the data lines disposed out of the transmitting chip, in the transmitting chip based on array information. Therefore, the technology of the present invention may be applied to diverse crosstalk prevention schemes that perform a crosstalk prevention operation by sensing the data pattern.

What is claimed is:

1. A system for transmitting data, comprising:
    a plurality of data lines configured to transmit the data; and
    a transmitting chip configured to output the data to the data lines and perform a crosstalk prevention operation in response to a data pattern of the data to be transmitted through the data lines and array information of the data lines to prevent crosstalk from occurring in the data lines.

2. The system of claim 1, wherein the transmitting chip comprises:
    a storage circuit configured to store the array information;
    a pattern sensing circuit configured to sense the data pattern of the data depending on an array of the data lines based on the array information; and
    a crosstalk prevention unit configured to perform the crosstalk prevention operation on the data to be outputted from the transmitting chip to the data lines in response to the sensed data pattern of the pattern sensing circuit.

3. The system of claim 2, wherein the pattern sensing circuit comprises:
    a data matching element configured to match the data to be transmitted through adjacent data lines among the data lines based on the array information; and
    a pattern sensing element configured to sense a data pattern of the data that are matched by the data matching element.

4. The system of claim 3, wherein the pattern sensing element is configured to enable an output result when one of the matched data is enabled to a first level and others of the matched data are enabled to a second level different from the first level.

5. The system of claim 3, wherein the transmitting chip further comprises:
    a plurality of drivers configured to output the data to the data lines.

6. The system of claim 5, wherein the crosstalk prevention unit adjusts a delay value of the drivers in outputting the data.

7. The system of claim 5, wherein the crosstalk prevention unit adjusts a driving force of the drivers in outputting the data.

8. An integrated circuit chip for transmitting data through a plurality of data lines, comprising:
    a plurality of drivers configured to output the data to the data lines;
    a storage circuit configured to store array information of the data lines;
    a pattern sensing circuit configured to sense a data pattern of the data to be transmitted through the data lines based on the array information; and
    a crosstalk prevention unit configured to control the data outputted by the drivers in response to the sensed data pattern of the pattern sensing circuit.

9. The integrated circuit chip of claim 8, wherein the array information is inputted from an outside of the integrated circuit chip.

10. The integrated circuit chip of claim 8, wherein the pattern sensing circuit comprises:
    a data matching element configured to match the data to be transmitted through adjacent data lines among the data lines based on the array information; and
    a pattern sensing element configured to sense a data pattern of the data that are matched by the data matching element.

11. The integrated circuit chip of claim 8, wherein the crosstalk prevention unit is configured to adjust a delay value of the drivers in outputting the data.

12. The integrated circuit chip of claim 8, wherein the crosstalk prevention unit is configured to adjust a driving force of the drivers in outputting the data.

13. A circuit board, comprising:
    a substrate;
    a transmitting chip disposed over the substrate;
    a receiving chip disposed over the substrate; and
    a plurality of data lines disposed between the transmitting chip to the receiving chip over the substrate,
    wherein the transmitting chip is configured to perform a crosstalk prevention operation for preventing crosstalk from occurring in the data lines in response to a data pattern of data to be transmitted through the data lines and array information of the data lines.

14. The circuit board of claim 13, wherein the transmitting chip comprises:
    a storage circuit configured to store the array information;
    a pattern sensing circuit configured to sense the data pattern of the data depending on an array of the data lines based on the array information; and
    a crosstalk prevention unit configured to perform the crosstalk prevention operation on the data to be outputted from the transmitting chip to the data lines in response to the sensed data pattern of the pattern sensing circuit.

15. The circuit board of claim 14, wherein the pattern sensing circuit comprises:
    a data matching element configured to match the data to be transmitted through adjacent data lines among the data lines based on the array information; and
    a pattern sensing element configured to sense a data pattern of the data that are matched by the data matching element.

16. The circuit board of claim 15, wherein the transmitting chip further comprises:
    a plurality of drivers configured to output the data to the data lines.

17. A method for transmitting data through a plurality of data lines, comprising:
    sensing a data pattern of the data depending on an array of the data lines in response to array information on the array of the data lines; and
    performing a crosstalk prevention operation on the data by loading the data on the data lines based on the sensed data pattern.

18. The method of claim 17, wherein the performing of the crosstalk prevention operation includes adjusting a delay value in the loading of the data.

19. The method of claim 17, wherein the performing of the crosstalk prevention operation includes adjusting a driving force in the loading of the data.

20. The method of claim 17, wherein the sensing of the data pattern comprises:

matching the data to be transmitted through adjacent data lines among the data lines based on the array information; and sensing the data pattern of the matched data.

21. The method of claim 17, wherein the data are loaded on the data lines through a plurality of data pins corresponding to the data lines, respectively, wherein, the array information represents a relationship between the array of the data lines and an array of the data pins.

* * * * *